No. 745,460. PATENTED DEC. 1, 1903.
C. P. STEINMETZ.
SYSTEM OF DISTRIBUTION.
APPLICATION FILED MAY 29, 1899.
NO MODEL.
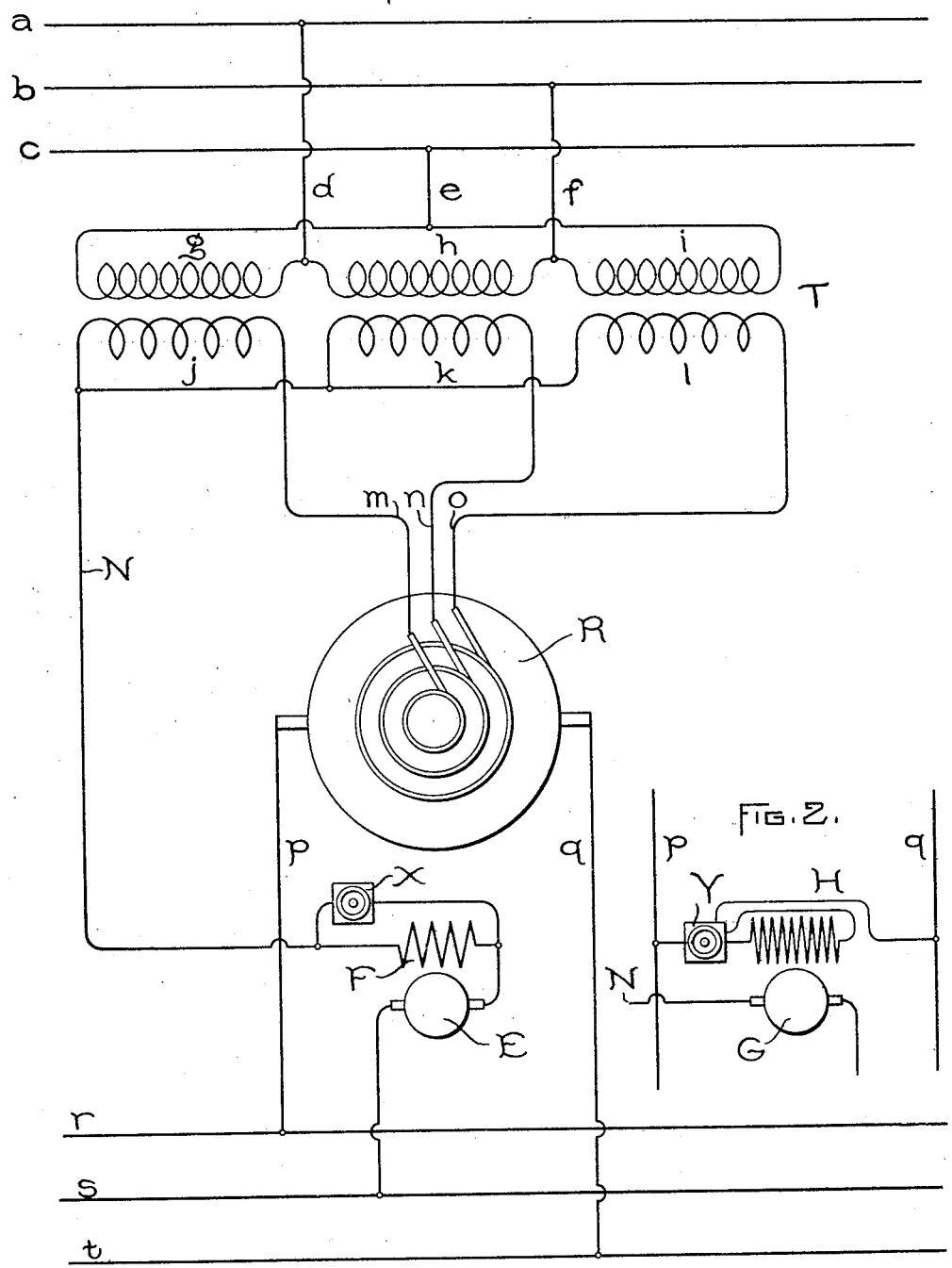
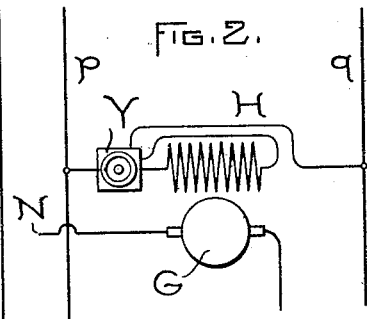
WITNESSES.
A. H. Abell.
A. F. Macdonald.
INVENTOR:
Charles P. Steinmetz,
by Albert G. Davis,
Atty.

No. 745,460. Patented December 1, 1903.

UNITED STATES PATENT OFFICE.

CHARLES P. STEINMETZ, OF SCHENECTADY, NEW YORK, ASSIGNOR TO THE GENERAL ELECTRIC COMPANY, A CORPORATION OF NEW YORK.

SYSTEM OF DISTRIBUTION.

SPECIFICATION forming part of Letters Patent No. 745,460, dated December 1, 1903.

Application filed May 29, 1899. Serial No. 718,642. (No model.)

*To all whom it may concern:*

Be it known that I, CHARLES P. STEINMETZ, a citizen of the United States, residing at Schenectady, in the county of Schenectady and State of New York, have invented certain new and useful Improvements in Systems of Distribution, of which the following is a specification.

In three-wire systems in which the neutral or compensating conductor is connected to a point having a potential intermediate between and fixed with respect to the main conductors with which it coöperates and in other systems having compensating or neutral conductors likewise related to main conductors with which they coöperate there is an inherent lack of means for regulation in cases where the system supplies an unbalanced load and under other conditions where it is desired to alter the potential difference between the compensating conductor and the main conductors. My invention aims to do away with this objection, and it accomplishes this result by means of an electromotive-force device arranged in circuit with the compensating conductor, the desired regulation being effected by varying the electromotive force of said device either at will or automatically, as desired.

While my invention is applicable to all systems possessing the general characteristics above described, I have considered it sufficient to illustrate its mode of application to one system only of the general type, since its application to other systems will be readily understood therefrom. The particular system which I have taken for purposes of illustration is that in which two main conductors lead from the direct-current terminals of a rotary converter and operate in conjunction with a compensating conductor, which is led back and connected to a neutral point on the alternating-current-supply system.

The scope of my invention will be clearly apprehended by reference to the appended claims, while its specific character and mode of application will be made apparent by reference to the following description, taken in connection with the accompanying drawings, in which—

Figure 1 represents a diagram of a distributing system embodying my invention, and Fig. 2 shows a detail.

In Fig. 1, $a\ b\ c$ represent the main conductors of a three-phase or other suitable alternating-current-supply system, to each of which conductors is connected one of the leads $d\ e\ f$ for supplying the primary of the mutiphase transformer T. In this instance the three primary coils $g\ h\ i$ are connected in closed circuit, otherwise known as a "delta" connection, with the leads $d\ e\ f$ connected, respectively, to the junction of the coils. The secondaries of the transformer T consist of three coils $j\ k\ l$, with one terminal of each coil connected to one of the supply-conductors $m\ n\ o$, leading to the collector-rings of a rotary converter R. The other terminals of the secondary coils are connected together, thus forming a point of neutral potential with respect to the electromotive forces impressed by the rotary converter R upon the direct-current mains $p\ q$, connected to the direct-current end of the rotary. A conductor N is shown as connected to the common connection of the coils $j\ k\ l$. This conductor includes in circuit therewith the electromotive-force device E, known generally as a "booster," and operates in conjunction with the mains $p\ q$ to form a three-wire system. The conductors of this system are shown in juxtaposition at $r\ s\ t$. The three-wire system thus formed is applicable to any of the known uses to which three-wire systems are adapted, and for this reason I consider it unnecessary to illustrate the use of translating devices in connection therewith, since the same is already known in the art.

The electromotive-force device E, as shown in Fig. 1, consists of a series-connected dynamo-electric machine connected in circuit with the compensating conductor N. This machine is intended to be positively driven in any suitable manner—such, for example, as by connecting its armature mechanically with the shaft of the rotary converter or to a separate electric motor or to any other suitable source of power. In order to adjust the electromotive force of the machine, a resistance X may be shunted about the field-winding F as a whole or about any suitable portion thereof. This resistance serves as a by-path for the current flowing through the machine and acts to alter the strength of the field F in inverse ratio to its magnitude. While I have thus shown a suitable field-regulating means, it will of course be understood that any other suitable device may be employed—such, for example, as one which operates by changing the number of field-turns or by varying the reluctance of the magnetic circuit of the machine.

When the three-wire system becomes unbalanced, more current flows on one side than on the other, and the difference between the loads is taken care of by means of current flowing over the neutral conductor. When this current flows, it energizes the field F of the electromotive-force device E and an electromotive force is produced by the device in opposition to the flow of current in the compensating conductor. This electromotive force increases with increase of current, and thus compensates automatically for variations in load, and so preserves a balance between the two sides of the system.

As will be readily understood, the electromotive force of the device E is added to that existing between the compensating conductor and one of the mains and is subtracted from that between the compensating conductor and the other main. The maximum electromotive force of the device E is therefore required to be only half of the maximum difference between the potentials existing between the neutral and the outside mains of the system, while its current capacity is represented by the difference between the currents flowing in the two sides of the system. Where a ten-per-cent. variation of electromotive force and a twenty-per-cent. variation in current between the two sides of the system is permitted as a maximum, the electromotive-force device is only one-half of one per cent. of the capacity of the rotary converter supplying the system and is thus of almost negligible size and cost.

In cases where it is desired to regulate the system by hand, different arrangements may be employed—such, for example, as indicated in Fig. 2, in which G represents the armature of the electromotive-force device connected in series with the compensating conductor N, the field-winding H being excited, not by current from the compensating conductor, but from some separate source of electromotive force—as, for example, from two of the mains of the three-wire system. A combined rheostat and reversing-switch Y or other appropriate means may be employed for controlling at will the field of the electromotive-force device.

What I claim as new, and desire to secure by Letters Patent of the United States, is—

1. The combination of an alternating-current system, a dynamo-electric machine connected thereto, direct-current mains leading from the machine, a compensating conductor operating in conjunction with said mains and connected at one end to a neutral point on the alternating-current system, and a source of electromotive force in circuit with said compensating conductor.

2. The combination of an alternating-current system, a dynamo-electric machine connected thereto, direct-current mains leading from the machine, a compensating conductor operating in conjunction with said mains and connected at one end to a neutral point on the alternating-current system, and a source of variable electromotive force in circuit with said compensating conductor.

3. The combination of an alternating-current system, a dynamo-electric machine connected thereto, direct-current mains leading from the machine, a compensating conductor operating in conjunction with said mains and connected at one end to a neutral point on the alternating-current system, and a source of automatically-variable electromotive force in circuit with said compensating conductor.

4. The combination of an alternating-current system, a dynamo-electric machine connected thereto, direct-current mains leading from the machine, a compensating conductor operating in conjunction with said mains and connected at one end to a neutral point on the alternating-current system, and a source of electromotive force in circuit with said compensating conductor and responsive to unbalancing of load on the direct-current mains.

5. The combination of a three-wire system of distribution, an alternating-current system, a dynamo-electric machine in circuit with the compensating conductor of the three-wire system, and a connection from the compensating conductor to a point on the alternating-current system.

6. The combination of a three-wire system of distribution supplied with energy derived from an alternating-current system and a dynamo-electric machine with its field and armature in circuit with the compensating conductor of the three-wire system and means for varying the ratio between the currents passing respectively through the field and armature of the machine.

7. The combination of a three-wire system, means for maintaining the conductors of the system at different potentials, and a dynamo-electric machine with its field and armature in circuit with the compensating conductor of the system.

8. The combination of a three-wire system and a power-driven dynamo-electric machine with its field and armature in series with each other and in circuit with the compensating conductor of the system.

9. The combination of direct-current mains, a compensating conductor coöperating therewith, and a booster in series circuit with said compensating conductor.

10. The combination of direct-current mains, a compensating conductor operating therewith, and a dynamo-electric machine with its field and armature in circuit with said compensating conductor, and a variable resistance in shunt to said field.

11. The combination of main conductors supplied with energy derived from an alternating-current system, a compensating conductor acting in conjunction therewith, and a dynamo-electric machine maintained at substantially constant speed, and in circuit with said conductor.

12. In a three-wire system of electrical distribution having its compensating conductor connected to a dynamo-electric machine through a transformer-winding, a dynamo-electric voltage-regulator having its armature and field-magnet windings connected in circuit with the compensating conductor and serving automatically to adjust the voltage of either side of the circuit in accordance with changes of load thereon.

In witness whereof I have hereunto set my hand this 26th day of May, 1899.

CHARLES P. STEINMETZ.

Witnesses:
BENJAMIN B. HULL,
MABEL E. JACOBSON.